United States Patent Office 3,486,920
Patented Dec. 30, 1969

3,486,920
PROCESS FOR BACKING TEXTILES WITH RUBBER AND RESULTANT PRODUCT
Edward Peter Campbell Sington, New Amberden Hall, Debden Green, Saffron Walden, Essex, England
No Drawing. Continuation of application Ser. No. 414,857, Nov. 30, 1964. This application Apr. 8, 1968, Ser. No. 719,765
Int. Cl. B44c *1/02;* B44d *1/46*
U.S. Cl. 117—10                8 Claims

ABSTRACT OF THE DISCLOSURE

A textile material, such as a carpet, is backed with a non-foamed rubber latex composition which includes a mineral filler and a gelling agent which are mixed prior to application of the latex to the fabric. Following application, the layer of latex is heated to effect gelation, then embossed to form a pattern and subsequently heated to dry the layer.

This application is a continuation of application Ser. No. 414,857, filed Nov. 30, 1964, which in turn is a continuation-in-part of my copending application Ser. No. 413,967 entitled "Process for Backing Textiles" filed on Nov. 25, 1964, both now abandoned.

This invention relates to a process for treating textiles, and is particularly concerned with a process for backing textile fabrics, such as carpets, with an elastomeric material and the products thereof.

It has been proposed to back textile fabrics, such as carpets, with foamed latex, and in this process rubber latex is mixed, just before use, with mineral fillers and foaming and stabilizing agents. The mix is then passed into an agitator where it is foamed and, when the product has been foamed a gelling agent may be added and the foamed mixture is then applied to the textile fabric which has to be coated. The coated textile fabric is then passed through an oven to gel the latex which may be then calendered and embossed, and is finally vulcanized.

Such a process requires a complex and expensive plant. Also, the foamed layer has a low wear resistance and, on account of its porosity, readily absorbs liquids, so that it is unsuitable for use in bathrooms and other areas where water is liable to spilt due to the long time that it takes to dry out. Furthermore, if the textile fabric is a tufted carpet, the foamed latex does not provide an adequate bond for the tufts and these have to be provided with a pre-coat before the foamed material is applied to the tufted carpet.

This invention contemplates a process for backing textile materials in which a rubber latex selected from the group consisting of natural rubber latex, synthetic rubber latex and a blend of such latices, is compounded with a mineral filler, and a gelling agent to produce a substantially non-foamed latex composition which is applied to a textile fabric material to produce a layer thereon. Thereafter, the layer is heated to effect gelation of the latex and the exposed surface of the gelled layer is embossed and subsequently dried. Preferably the compounded rubber latex composition (or mixture) includes a vulcanizing agent so that the embossed gelled latex layer can be vulcanized and dried by subsequent heating.

Exemplary of the synthetic rubber latices suitable for the purpose of this invention are latices of diolefinic copolymer rubbers, i.e. emulsion copolymers containing a major amount of diolefin such as butadiene with lesser amounts of ethylenically unsaturated monomers such as styrene, acrylonitrile, methyl acrylate and the like and mixtures thereof. Also included are latices of neoprene, butyl rubbers and the like.

Particularly effective latices are cold temperature emulsion polymerized copolymers of butadiene and styrene with the butadiene monomer content being at least 60% by weight of the copolymer. One of these copolymers is commonly designated as a GR-S 2105 latex and is prepared from a monomer mixture of 70% by weight of butadiene and 30% by weigh of styrene.

The compounded latex mixture is preferably of such viscosity that it can be readily spread by a comb applicator which ensures that the compound latex is applied evenly across the width of the substrate, and the coated fabric is then heated to gel the latex, whereafter the gelled latex is embossed to form a pattern. The embossing may be produced by the application under pressure of an embossed roller or plate to the exposed surface of the gelled latex. A preferred form of embossing plate or roller is one that will confer on the gelled latex a pattern in which raised and compressed areas alternate, the latter comprising about 70% of the total area.

On embossing, the gelled material has sufficient mobility to be squeezed from the areas of compression into the areas of the relief, although the gelled material itself is substantially imcompressible. The resultant backing confers upon the carpet or textile a handle and a stability that can be achieved only by the use of much greater weights of unembossed compound. A further advantage of an embossed pattern is that it is possible to achieve a non-slip finish on the back of a textile or carpet with very much less compound than would be necessary if the compound were to be distributed in a layer of uniform thickness.

As indicated above, the compounded rubber latex mixture which may include a natural latex, a synthetic latex or a blend of such latices, has a relatively low viscosity which is between 200 and 1,000 centipoises, preferably between 250 and 600 centipoises and is mixed with the gelling agent, just before use. All viscosities are measured at a shear rate of 236 reciprocal seconds. The vulcanizable latex itself, before the addition of the gelling agent, has a relatively long storage life of more than three months, and when mixed with the gelling agent has a life of about twenty-four hours, so that the processor of the carpet or other fabric can purchase the vulcanizable latex from the manufacturer and prepare the latex for use by the addition of the gelling agent, as required.

The gelling agent may be any of those conventionally used for gelling latex, for example, an ammonium salt, such as ammonium chloride, ammonium sulphate or ammonium acetate, or a zinc ammonium salt, such as zinc ammonium sulphate; zinc oxide, which is often present in compounded rubber, latices, itself acts as a gelling agent, but it is preferred to use zinc oxide in conjunction with another of the gelling agents just indicated.

A large proportion of mineral filler which may amount to about 250 or more parts by weight of filler per 100 parts of dry latex, may be added to the latex mix, but it is preferred to add from about 100 to about 200 parts by weight of filler per 100 parts of dry latex. The filler may be any of those conventionally used for filling latex, such as whiting, barytes, clay, silica, and the like.

The gelled latex is not compressible as is the previously used foamed material, and is therefore more easily pressed into the weave of the fabric to provide the fabric with deformation resistance and, in the case of tufted carpets, to provide firm anchorage for the tufts.

In order to enable the invention to be more readily understood, examples thereof will now be described in greater detail, with the ingredients of the compounded latex mixture being given in parts by weight unless otherwise specified.

EXAMPLE I

A compounded rubber mix was prepared in the laboratory in a mixer from the following ingredients:

| | |
|---|---|
| Natural rubber latex (73% total solids) | 51 |
| Dispersion of equal parts by weight of vulcanizing agents (zinc diethyldithiocarbamate and mercaptobenzthiazyl disulphide) | 8 |
| Mineral filler (a mixture of whiting and barytes in the weight ratio 2:1) | 37 |
| Aqueous solution of a thickener (ammonium salt of a water-soluble copolymer of acrylic and methacrylic acids) | 4 |

There was then added to the mixture 2 parts by weight of a 20% aqueous solution of ammonium acetate as a gelling agent. The resulting mixture was applied at the rate of 1,000 g. wet compound per square metre to a nylon pile cotton stockingette fabric. The fabric was placed under infra-red lamps for 3 minutes with the compound exposed to produce gelation. An embossed plate having a square pattern and recessed to a depth of 1.5 mm. was placed over the compound and both plate and fabric were subjected to a load of 25 kg. per square centimeters for 5 seconds. The fabric and the plate were immediately separated and the fabric was heated under infra-red lamps to vulcanize the compound and remove surplus moisture.

The resulting backed fabric had good non-slip properties, excellent dimensional stability and a much improved handle. Such a fabric would be suitable for scatter rugs.

EXAMPLE II

A compounded rubber latex mix was prepared in a mixer from the following ingredients:

| | |
|---|---|
| Natural rubber latex (73% total solids) | 170 |
| Whiting | 300 |
| Titanium dioxide | 112 |
| Water | 12 |
| Anchoid [1] | 4 |
| A 14% solution of ammonium caseinate | 20 |
| A 50% aqueous dispersion of sulphur | 2.0 |
| A 50% aqueous dispersion of Santowhite powder [2] | 1.0 |
| A 10% aqueous solution of the ammonium salt of a water soluble copolymer of methyl methacrylate and methacrylic acid (depending on the viscosity required) | 4–8 |
| A 50% aqueous dispersion of zinc oxide | 18 |
| A 50% aqueous dispersion of zincdibutyldithiocarbamate | 4 |
| A 50% aqueous dispersion of mercaptobenzthiazyl disulphide | 2 |

[1] Polymerized sodium salts of alkyl naphthalene sulfonic acid.
[2] 4,4'-butylidene-bis(6-tert-butyl-meta-cresol).

This compounded mix was pumped through a blender into which was continuously metered 2½ parts by weight per 100 parts by weight of mix of a 20% aqueous solution of ammonium acetate as a gelling agent. The resulting mixture was applied by a comb doctor at the rate of 2,000 g. per square meter to a stentered nylon pile cotton stockingette fabric 1.5 meters in width. The coated fabric, still on the stenter was passed at a rate of 1 meter per minute under a bank of infra-red heating elements for three minutes with the latex mixture exposed to the lamps, whereupon gelation of the mixture occurred.

The fabric, with the gelled compound in it, was passed between the bowls of an embossing calender, the upper bowl of which carried a pattern to be embossed in the gelled compound. The bowls of the calender had a diameter of 17 cm. and pressed with a force of 4 kg. per cm. at the aforesaid speed of 1 meter per minute. A pattern having a depth of embossing of 2.0 mm. was obtained, the pattern being well defined and persisting with no shrinkage.

The fabric, still on the stenter, was passed through a drying and vulcanizing oven heated by hot air and maintained at a temperature of 135° C., and remained in the oven for 15 to 20 minutes.

The resulting backed fabric had good non-slip properties, excellent dimensional stability and a good handle. Such a fabric would be suitable for scatter rugs.

EXAMPLE III

A compounded rubber mix was prepared in a mixer from the following ingredients, all part being given in parts by weight:

| | |
|---|---|
| Natural rubber latex (73% total solids) | 135 |
| Whiting | 200 |
| Titanium dioxide | 8 |
| Water | 75 |
| Anchoid [1] | 2 |
| A 14% solution of ammonium caseinate | 10 |
| A 50% aqueous dispersion of sulphur | 1 |
| A 50% aqueous dispersion of Santowhite Powder [2] | 0.5 |
| A 10% aqueous solution of the ammonium salt of a water soluble copolymer of methyl methacrylate and methacrylic acid (depending on the viscosity required) | 5–7 |
| A 50% aqueous dispersion of zinc oxide | 5 |
| A 50% aqueous dispersion of zincdibutyldithiocarbamate | 2 |
| A 50% aqueous dispersion of mercaptobenzthiazyl disulphide | 1 |

[1] Polymerized sodium salts of alkyl naphthalene sulfonic acid.
[2] 4,4'-butylidene-bis(6-tert-butyl-meta-cresol).

This compounded mix was pumped through a blender into which was continuously metered 2½ parts by weight per 100 parts by weight of mix of a 20% aqueous solution of ammonium acetate as a gelling agent.

The compounded latex mix was applied in the manner described in Example II, as a wet coating of 1,800 g. per square meter on the back of 5/32 inch looped pile tufted carpet 5 meters wide without pre-coating. The procedure was the same as that described in Example II.

The resulting tufted carpet had a tuft bond strength of between 4 and 5 pounds, which is commensurate with what would be expected from a carpet with an unpatterned backing, whilst having good non-slip properties.

EXAMPLE IV

A compounded rubber latex mixture is prepared from the following ingredients:

| | |
|---|---|
| 50:50 blend of natural rubber latex and a synthetic rubber latex of a copolymer of 70% butadiene and 30% styrene (70% total solids) | 200 |
| Whiting and barytes in a 2:1 weight ratio | 200 |
| Sodium salt of polymethylacrylic acid | 4–10 |
| Water | 20 |

This compounded blend of natural and synthetic latex is mixed with 3½ parts by weight per 100 parts by weight of the latex mixture of a 20% aqueous solution of ammonium acetate serving as gelling agent. The gellable mixture is doctored onto the back side of a looped pile tufted carpet and heated by infrared lamps for about 4 minutes to effect gelation thereof. The so treated tufted carpet was then embossed with rolls of an embossed calender similar to that used in Example II to produce an embossed layer of natural and synthetic latex that shows good dimension stability and good non-slip properties.

It will be appreciated, as illustrated by the above data, that various compounding ingredients, including thickeners, stabilizers, antioxidants, gelling agents and the like may be incorporated into the substantially non-foamed latex composition of this invention.

It will be further appreciated that many textile fabric materials can be used in this invention. Representative of these textiles are cloth for upholstery, blankets, and carpets of many conventional types including Axminster, Wildman, tufted and the like.

It will be understood that as used herein the expression "substantialy non-foamed latex composition" refers to a latex composition containing less than about 10 percent by volume of air therein.

I claim:

1. A process for backing a textile material which comprises applying to one side of a textile fabric material a layer of a substantially non-foamed rubber latex composition containing a latex selected from the group consisting of a natural rubber latex, a synthetic rubber latex, and a blend of such latices, a mineral filler and a gelling agent which are mixed with the latex prior to application thereof to the fabric, heating the layer to effect rapid gelation thereof, said heating leaving the gelled material with sufficient mobility to be squeezed upon embossing from areas of compression into areas of relief, embossing the exposed surface of the gelled layer before any subsequent drying of the latex to form a pattern thereon and to press the gelled layer into the fabric, and subsequently heating the embossed layer to dry it.

2. The process of claim 1, in which the rubber latex composition also contains a vulcanizing agent, whereby the embossed gelled mix is subsequently vulcanized and dried by said heating.

3. The process of claim 1 in which the composition has a viscosity between about 250 and about 650 centipoises prior to said gelation at 236 reciprocal seconds.

4. The process of claim 1 in which the textile fabric material is a tufted carpet and the latex composition is applied directly to the back of said tufted carpet.

5. The process of claim 1 in which said latex composition initially contains zinc oxide and ammonium acetate is added thereto shortly before the composition is applied to the fabric material.

6. The process of claim 1 in which the latex composition is applied in an amount not less than about 1,000 grams per square meter of textile material.

7. An elastomer-backed textile fabric produced by the method of claim 1.

8. The elastomer-backed textile of claim 7 in which the fabric material is a tufted, woven, Axminster or Wildman carpet.

References Cited

UNITED STATES PATENTS

| | | | |
|---|---|---|---|
| 2,235,148 | 3/1941 | Gartrell | 156—220 |
| 2,318,702 | 5/1941 | Millar | 156—219 |
| 2,585,109 | 2/1952 | Gordon | 264—284 XR |
| 2,776,233 | 1/1957 | Roberts | 161—67 |
| 3,236,926 | 2/1966 | Wisotzky | 156—209 |
| 3,301,740 | 1/1967 | Stiehl et al. | 161—89 |

OTHER REFERENCES

R. J. Noble, Latex in Industry, N.Y., The Rubber Age, 1936, pp. 155–163, 334, 337.

R. J. Noble, Latex in Industry, 2nd ed., N.Y., The Rubber Age, 1953, pp. 348–359.

ROBERT F. BURNETT, Primary Examiner

R. H. CRISS, Assistant Examiner

U.S. Cl. X.R.

117—11, 161, 163; 156—219; 161—66, 67, 94, 116; 264—284